Patented Mar. 29, 1932

1,851,607

UNITED STATES PATENT OFFICE

WILLEM JOHANNES DOMINICUS VAN DIJCK AND HENDRIK HEERE RADIER, OF THE HAGUE, NETHERLANDS, ASSIGNORS TO NAAMLOOZE VENNOOTSCHAP DE BATAAFSCHE PETROLEUM MAATSCHAPPIJ, OF THE HAGUE, NETHERLANDS

PROCESS OF PREPARING CONDENSATE FROM GASES

No Drawing. Application filed July 21, 1930, Serial No. 469,623, and in the Netherlands June 29, 1929.

Our invention relates to a process of preparing condensate from gases. Although as such it is very widely applicable, it will be described hereinafter, by way of example, in respect to the extraction of benzine (i. e. gasoline, etc.) from hydrocarbon gases as occurring in the oil industry, such as cracking-, destructive hydrogenating-, distilling-, natural- and so-called casinghead-gases, more particularly from the latter material to be specified hereinafter as wellgas.

It is known that some of the constituents of wellgas, i. e. the gas escaping from the casinghead of oilwells, either in themselves or mixed with other similar substances yield a suitable benzine for commercial purposes. These constituents are extracted from the said gas by compression, adsorption or absorption. Now our invention relates to a process in which the yield of condensate by compression- and adsorption methods, which both are based in principle on condensation, can be increased in a very simple manner. We will specify our invention with reference to a description of the compression method, but it should be understood that it likewise applies to the adsorption method, which, as is known, is carried out with the aid of charcoal in adsorption towers and the like.

When applying the compression method to wellgas, this gas is compressed by means of one or more compound compressors to a pressure ranging between 4 and 25 atmospheres, and subsequently passed through one or more coolers, in which it is exposed first to a temperature of about 30° C., and thereafter to a temperature of about 3° C. The constituents suitable for benzine, which are condensed during these treatments, are separated from the remaining constituents present in the gaseous phase and conducted to collecting tanks, whilst the gas is drawn off separately.

It has now been found that in the condensation methods hitherto known and applied not all of the benzine in the gas is extracted therefrom and the invention provides the way to obtain increased yields of benzine (gasoline etc.).

In fact, the invention is based on the fact, that a more complete separation of the desired constituents takes place if care is taken, that a component or group of components having a lower boiling point than the lowest boiling component of the constituents to be extracted from the gas mixture as condensate, is present in excess. Furthermore the said component or group of components must be capable of maintaining the liquid state in the condensate under the conditions of the condensation.

It has previously been proposed to mix wellgas and similar gases with oil, as a result of which the total vapour pressure of the mixture is lowered and a certain amount of the constituents originally present in the gaseous phase is absorbed by the high-boiling oil.

In respect to this known fact the process according to the present invention is distinguished by low-boiling instead of high-boiling substances being brought into contact with the gas, giving rise, it is true, to an increase of the total vapour pressure, but on the other hand the low boiling substances play a comparatively larger part in the said vapor pressure, so that the high-boiling substances are present in the vapor in a relatively, (i. e. in respect to the state in which they only would be present) smaller quantity and consequently in the liquid in a larger quantity.

The process according to our invention thus consists in that the gas carrying the constituents to be condensed during the condensation, a substance or group of substances is caused to be present in excess (e. g. added to the mixture), the boiling point of which substance or entire group of substances lies below that of the lowest-boiling constituents of the groups of components which it is desired to obtain. In accordance with this invention we add exclusively such materials, and not any products of higher boiling point than the product to be condensed. By "excess" in this case is meant that which is present over and above the quantity present naturally in the gas.

Thus, for instance, in the case of a gas exclusively consisting of methane and homologues, such as ethane, propane, butane, pentane, hexane, etc., propane will be added to the gas if it is chiefly desired to obtain butane, pentane and higher homologues. The yield of the desired components will then be greater according as more propane is present.

The material to be added may be derived from any suitable available source. In some cases it will be deemed preferable to obtain same from the gas under treatment by applying a process of circulation, in which the material is either accumulated in the system or, subject to a sufficient amount being present, continues to circulate therein. This process is specially recommendable when preparing benzine from wellgas, whereby a stabilizer is provided, which serves to remove the lowest-boiling consituents from the condensate. From these constituents the material required for the application of the process according to the invention (e. g. propane) may then be separated in some suitable manner and added to the gas entering the system.

What we claim is:

1. A process of preparing a condensate from a gas consisting largely of hydrocarbons initially carrying a desired condensable hydrocarbon substance in the form of a vapor, which comprises contacting the gas with a substance consisting exclusively of liquefiable components having boiling points lower than that of the lowest boiling component of the condensate to be produced, in the absence of added constituents less volatile than said condensate, and thereafter subjecting the mixture to a condensing operation in the absence of added oily materials less volatile than said condensate.

2. A process as covered in claim 1, in which the gas treated is selected from the herein described group consisting of casinghead gas, gases from oil distillation, gases from oil cracking and gases from destructive hydrogenation of hydrocarbons.

In testimony whereof we have affixed our signatures.

WILLEN JOHANNES DOMINICUS VAN DIJCK.
HENDRIK HEERE RADIER.